(12) United States Patent
Hingst et al.

(10) Patent No.: US 12,044,579 B2
(45) Date of Patent: Jul. 23, 2024

(54) BEARING TEMPERATURE SENSOR SYSTEM, DEVICE AND KIT

(71) Applicant: Advanced Bearing Solutions PTY LTD, Cannon Hill (AU)

(72) Inventors: Shane Hingst, Burbank (AU); Jason Laporte, Cannon Hill (AU)

(73) Assignee: Advanced Bearing Solutions PTY LTD, Cannon Hill (AU)

( * ) Notice: Subject to any disclaimer, the term of this patent is extended or adjusted under 35 U.S.C. 154(b) by 856 days.

(21) Appl. No.: 16/977,283

(22) PCT Filed: Mar. 10, 2019

(86) PCT No.: PCT/AU2019/050215
§ 371 (c)(1),
(2) Date: Sep. 1, 2020

(87) PCT Pub. No.: WO2019/169457
PCT Pub. Date: Sep. 12, 2019

(65) Prior Publication Data
US 2021/0364362 A1    Nov. 25, 2021

(30) Foreign Application Priority Data
Mar. 5, 2018  (AU) ................................ 2018201568

(51) Int. Cl.
*G08B 21/00*    (2006.01)
*B60B 7/00*    (2006.01)
(Continued)

(52) U.S. Cl.
CPC ............ *G01K 1/024* (2013.01); *B60B 7/0013* (2013.01); *G01K 13/08* (2013.01); *G01P 3/443* (2013.01);
(Continued)

(58) Field of Classification Search
CPC .......... G01K 1/024; G01K 13/08; G01K 7/01; B60B 7/0013; G01P 3/443; G07C 5/0825;
(Continued)

(56) References Cited

U.S. PATENT DOCUMENTS 5,381,090 A * 1/1995 Adler ...................... G01P 3/487
188/DIG. 1
5,633,628 A * 5/1997 Denny ...................... B61K 9/04
340/682

(Continued)

*Primary Examiner* — Mark S Rushing
(74) *Attorney, Agent, or Firm* — Hinckley Allen & Snyder; Stephen Holmes

(57) ABSTRACT

In an aspect of the present disclosure there is provided a temperature monitoring system, a non-transitory computer-readable storage medium for a wheel assembly and a monitoring device engageable with the hub of a wheel assembly. There is provided a sensing unit mounted proximal to at least one or more bearings of a wheel hub supporting rotation relative to a spindle, and configured for detecting and transmitting at least temperature and motion information thereof. A receiver is configured for wirelessly receiving the at least temperature and motion information from the sensing unit and wirelessly re-transmitting the information to a portable electronic communication device.

20 Claims, 9 Drawing Sheets

(51) Int. Cl.
  *G01K 1/024* (2021.01)
  *G01K 13/08* (2006.01)
  *G01P 3/44* (2006.01)
  *G07C 5/08* (2006.01)
  *H04Q 9/00* (2006.01)

(52) U.S. Cl.
  CPC ............ *G07C 5/0825* (2013.01); *H04Q 9/00* (2013.01); *H04Q 2209/40* (2013.01)

(58) Field of Classification Search
  CPC .... H04Q 9/00; H04Q 2209/40; F16C 19/525; F16C 41/008; F16C 33/7886; F16C 33/723; F16C 2233/00; B60Q 9/00; G08B 21/182; G08C 17/00
  USPC ........................................................ 340/459
  See application file for complete search history.

(56) References Cited

U.S. PATENT DOCUMENTS

| | | | |
|---|---|---|---|
| 6,538,426 B1* | 3/2003 | Enrietto | F16C 41/007 374/E13.01 |
| 2002/0130771 A1* | 9/2002 | Osborne | B60C 23/008 340/441 |
| 2004/0036601 A1* | 2/2004 | Obradovich | B60C 23/20 340/425.5 |
| 2011/0043353 A1* | 2/2011 | Wagner | B60C 23/0416 340/442 |
| 2012/0032793 A1* | 2/2012 | Sonzala | B60T 5/00 152/417 |
| 2019/0154491 A1* | 5/2019 | Bunner | G01G 19/12 |
| 2021/0061027 A1* | 3/2021 | Da Deppo | B60C 23/041 |

\* cited by examiner

BEARING TEMPERATURE SENSOR SYSTEM, DEVICE AND KIT

FIELD

The present disclosure relates to an improved wheel bearing temperature sensor system, monitoring device and kit.

BACKGROUND

Wheels on trailers, (including boat trailers, semi-trailers and the like) typically have a hub in the center through which the spindle part of the associated axle is inserted. The interface between the hub and the spindle is provided by inner and outer bearings contained within corresponding races (matching rings which contain the bearings). Ideally, all of the weight carried by the axle rests equally on the bearings.

Lubrication between the bearing rollers and races with grease or oil reduces friction and transfers heat away from the bearings and to the hub, where it can dissipate and is critical in preventing wheel separation.

Situations where the axle nut is too tight, too loose, or when the vehicle is overloaded often result in inadequate lubrication between the bearing rollers and races resulting in metal on metal contact. Alternatively, poor maintenance, lubricant exposure to moisture (e.g. bearings on boat trailers, trucks in flood conditions); lubricant getting too old; broken hub caps and failed seals or compromise of the lubricant with dust/water can also result in metal on metal contact in the bearings. Especially in the case of the wheel hubs of boat trailers, each immersion in water to launch the boat is in effect a potential challenge to the integrity of the bearings.

Irrespective of the cause, an inadequate lubrication barrier between the bearing rollers and bearing races can increase the likelihood that the bearing is likely to overheat and fatigue, which can lead to full bearing lockup and hub separation.

Monitoring the operating conditions of bearings is difficult as the bearings cannot be visually inspected, typically being either packed in grease or bathed in oil. However, most bearing failures are progressive and usually associated with increased temperature due to increased friction in the bearing components prior to failure.

It is possible to detect the increased temperature by physically placing the back of a hand or temperature sensing "heat guns" proximal to the bearings at infrequent intervals after a period of use. However, it would be appreciated that this is inconvenient, potentially inaccurate and can be dangerous. Alternatively, adding wired temperature probes to the bearings is inconvenient, and somewhat unreliable in view of the challenging environment in which these bearings operate.

Accordingly, there exists a need to provide a bearing temperature sensor, which addresses or ameliorates at least one or more of the above problems, or at least provides the public with further choice.

SUMMARY

In a first aspect of the present disclosure there is provided a temperature monitoring system for a wheel assembly comprising:

A sensing unit mounted proximal to at least one or more bearings of a wheel hub supporting rotation relative to a spindle, and configured for detecting and transmitting at least temperature and motion information thereof, A receiver configured for wirelessly receiving the at least temperature and motion information from the sensing unit and wirelessly re-transmitting the information to a portable electronic communication device.

Optionally, the sensing unit transmits the at least temperature and motion information to the receiver via radio frequency (RF) wireless transmission.

Advantageously, the receiver re-transmits the information via Bluetooth wireless transmission to the portable electronic communication device.

The sensing unit may be mounted in a dust cap arranged in thermal contact with at least a portion of the hub.

Preferably, a processor of the sensing unit may be configured to commence transmission of the temperature information of the bearings upon detection of motion of the wheel.

Advantageously, an accelerometer in the sensing unit is configured to detect the motion of the bearings.

Optionally an indicating means is mounted to the hub cap for visually displaying that a predetermined temperature threshold has been exceeded.

In a further aspect of the present invention there is provided a monitoring device engageable with the hub of a wheel assembly, the monitoring device comprising:

one or more sensors configured to detect temperature data and motion information of a wheel assembly, one or more processors coupled to the one or more sensors; and a non-transitory machine readable storage medium coupled to the one or more processors and having instructions stored in the storage medium, which when executed by the one or more processors, cause the monitoring device to:

transmit unique identification information of the monitoring device for establishing a wireless communications link between the monitoring device and a remote relay device, periodically detect and transmit over said link a plurality of temperature measurements of a hub of the wheel assembly during one or more time intervals to the remote relay device for retransmission to a portable electronic communications device, upon detecting the absence of movement over a predetermined time determining that the wheel assembly has transitioned into an inoperative state and to decrease the power provided to the one or more sensors.

Advantageously, the non-transitory machine readable storage medium coupled to the one or more processors has instructions stored in the storage medium, which when executed by the one or more processors, cause the monitoring device to transmit unique identification information of the monitoring device for establishing the wireless communications link between the monitoring device and a remote relay device.

The monitoring device may transmit the temperature and motion information to a remote receiver/transmitter device via radio frequency (RF) wireless transmission.

Optionally, the remote receiver/transmitter device may re-transmit the temperature and motion information via Bluetooth wireless transmission to the portable electronic communications device.

Advantageously, the monitoring device is mounted in a dust cap arranged in thermal contact with at least a portion of the hub.

Preferably a processor of the monitoring device is configured to commence transmission of the temperature information of the bearings upon detection of motion of the wheel.

Advantageously, an accelerometer in the sensing unit detects the motion of the wheel.

In a further aspect of the present disclosure there is provided a non-transitory computer-readable storage medium storing a computer program, the computer-readable storage medium comprising:

program instructions for wirelessly transmitting temperature data using a processor at a relay device to at least one remotely located portable electronic communication device, the relay device having a memory for storing computer instructions of a computer program and the processor for executing the computer instructions;

program instructions for establishing using the processor a communications link with one or more remotely located monitoring devices fitted to a wheel assembly to provide temperature and motion information of said wheel assembly to the at least one remotely located portable electronic communication device.

In yet a further aspect there is provided non-transitory computer-readable storage medium storing a computer program, the computer-readable storage medium comprising:

program instructions for wirelessly receiving temperature data using a processor of a portable electronic communication device from a remotely located relay device in communication with a monitoring device of at least one or more remote wheel assemblies, the portable electronic communication device having a memory for storing computer instructions of a computer program and the processor for executing the computer instructions;

program instructions for establishing using the processor a communications link with the remote relay device to receive from the relay device temperature and motion information of one or monitoring devices fitted to the at least one or more remote wheel assemblies and in wireless communication therewith;

program instructions for determining using the processor, based on the received temperature data, one or more time periods associated with motion data indicating that the bearing has entered a potential failure state.

It would be appreciated that sensing unit mounted proximal to at least one or more bearings of a wheel hub supporting rotation relative to a spindle, and configured for detecting and transmitting at least temperature and motion information thereof, and receiver configured for wirelessly receiving the at least temperature and motion information from the sensing unit and wirelessly re-transmitting the information to a portable electronic communication device could be provided in kit form.

FIGURES

FIG. 2b is a schematic view an embodiment of the monitoring cap depicted in FIG. 2a.

FIG. 2c is a top view of the PCB of the monitoring cap depicted in FIG. 2a.

FIG. 2e is an exploded perspective views of an embodiment of the monitoring cap depicted in FIG. 2a.

FIG. 5a is a representative schematic view of the setup screen for enabling pairing of the portable electronic communication device with the receiver/transmitter device of FIG. 3a.

DETAILED DESCRIPTION

Figure 1:
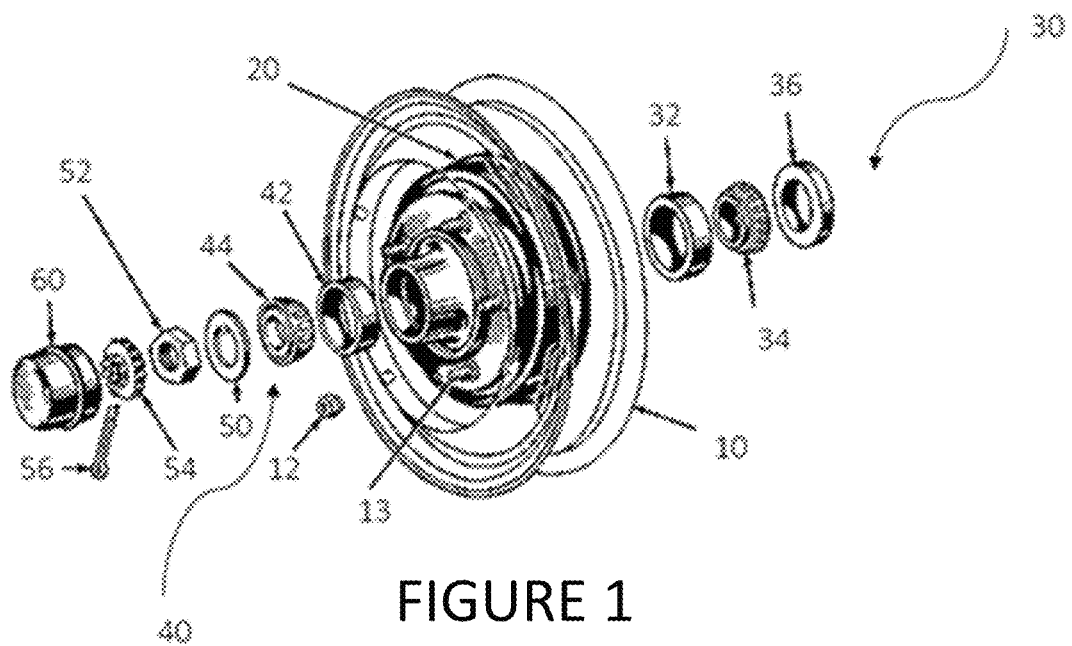
FIG. 1 depicts the arrangement of a typical wheel assembly.
Figure 2A:
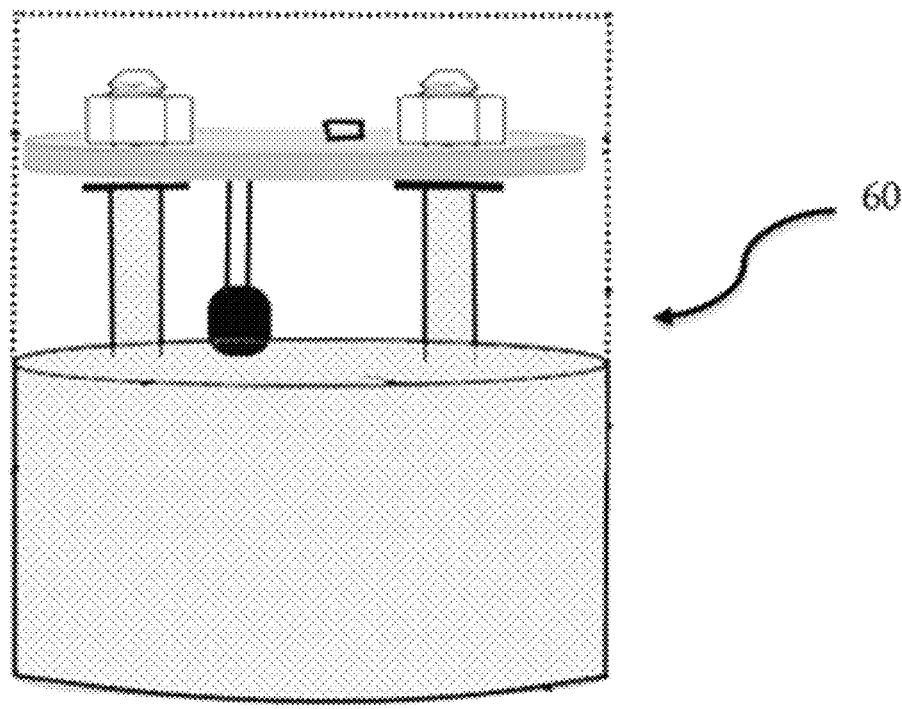
FIG. 2a is a perspective view of the monitoring cap of an embodiment of the present disclosure.
Figure 2B:
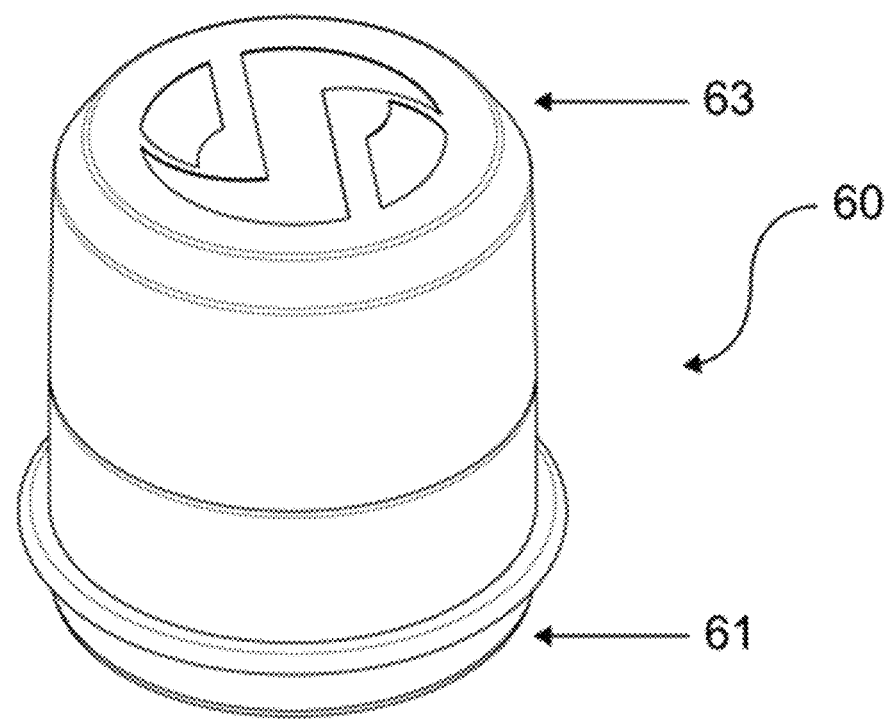
Figure 2C:
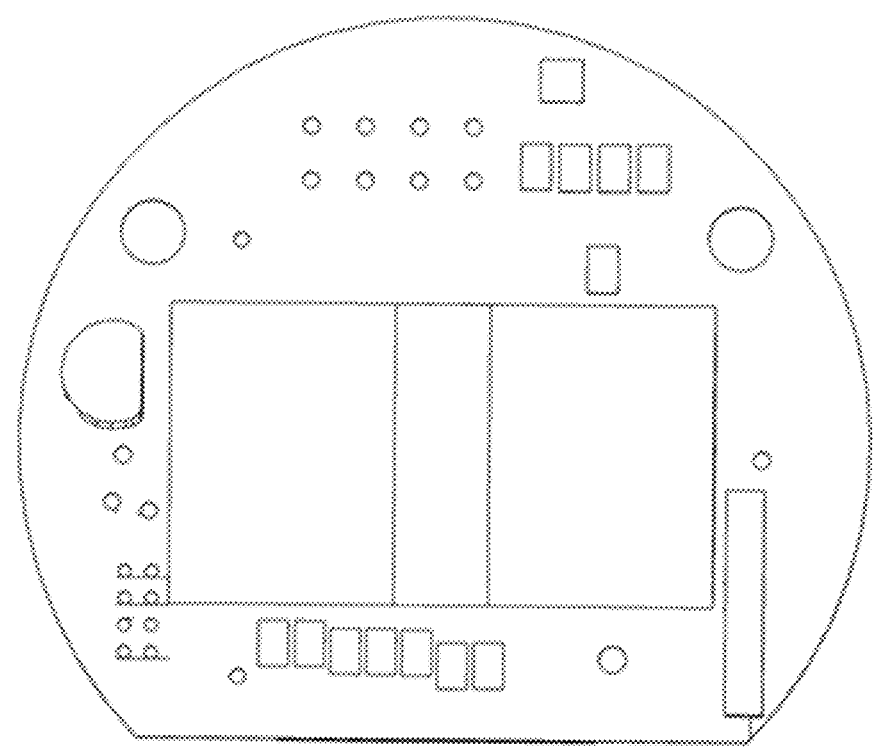
Figure 2D:
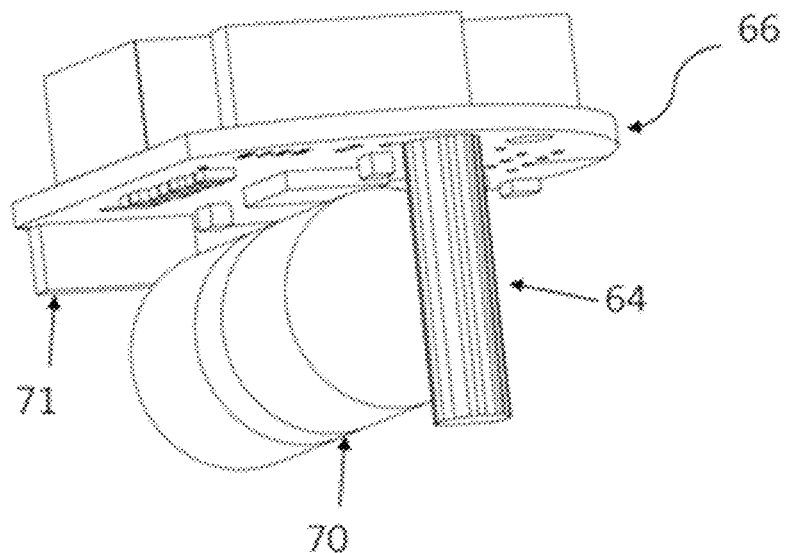
FIG. 2d is a underplay perspective view of the PCB of the monitoring cap of FIG. 2c.
Figure 2E:
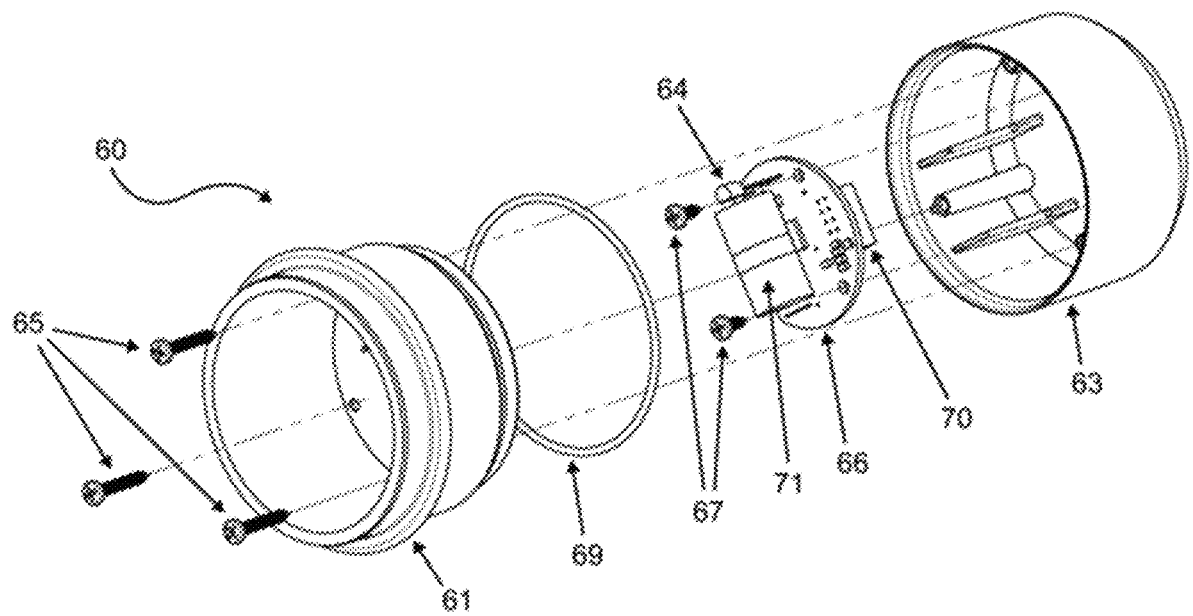

Referring to FIG. 1, there is shown a typical wheel assembly 10 to which embodiments of the monitoring system of the present invention may be attached. A person skilled in the art would appreciate that the components in this assembly are typical to assemblies in the art and variations of these would be suitable for use with the present invention, the monitoring component of which is included in the grease cap.

The wheel assembly 10 is fitted about a wheel hub and rotor assembly 20 as shown (brakes and axle removed for clarity). A single wheel nut 12 is shown which is capable of threaded engagement with the hub nut 13 of the wheel assembly 10 with the hub and rotor 20 in accordance with typical arrangement in the art. Other wheel nuts have been omitted for clarity.

The inner bearings 30 comprise the inner bearing cup 32, inner bearing cones and roller 34 and grease retaining ring 36 as shown. An optional water shield may also be included, although this has been omitted for clarity.

The outer bearings 40 comprise an outer bearing cup 42, outer bearing cones and rollers 44. The inner and outer bearings are secured in place in the rotor through the combined interactions of the thrust washer 50, adjusting nut 52, adjusting nut lock 54 (such as a castellated nut) together with a cotter or split pin 56.

The grease cap, otherwise known as the dust cap, 60 is fitted on top of the securing arrangement for the bearings to exclude water and retain the grease inside the hub in position to lubricate the inner and outer bearings. The grease cap is typically press fitted and then lightly hammered into place for a good seal.

In the preferred embodiment of the present disclosure, the temperature sensor is mounted in the grease cap 60.

Referring to FIGS. 2a-2e, a schematic view and views of an exemplary embodiment of the monitoring grease cap 60 of the present disclosure is shown in more detail. Advantageously, multiple monitoring caps according to the present disclosure may be fitted to a vehicle, preferably to each hub. As such, this may mean that there are 2, 4 or more monitoring caps, which may be fitted. Accordingly, each temperature reporting monitoring cap 60 has a unique Identification Number (GUID) for identifying the information of the hub to which that specific monitoring cap 60 is attached.

The cap housing 62 preferably includes a pre-forged metal grease cap 61 to which a plastic epoxy cap 63 is attached. Advantageously the electronic components of the present disclosure can be retained within the plastic epoxy cap 63.

A temperature sensor 64 is included for sensing the temperature of the cap. Preferably the sensor is a contact sensor, which is mounted close to metal grease cap 61, preferably at a location on this cap proximal to the region of the cap near the outer bearings 40 as these have a tendency to overheat more quickly than the inner bearings. However, it would be appreciated that other arrangements and other sensors could also be included. In one embodiment of the present disclosure the temperature sensor used is a Texas Instruments LMT84. Optionally, the sensor may also have thermal paste or thermal pad at the top, for enhancing the conduction of heat from bearings. Two fastening means (such as screws) 67, may be used to attach PCB (printed circuit board) 66 to the plastic epoxy cap 63.

Another sensor mounted to the PCB is an accelerometer 71 for detecting the motion of the hub unit, enabling the cap 60 to conserve battery life only in the event that motion is detected. Typical accelerometers which are used in the present disclosure include a STMicroelectronics LIS2DE. Similar accelerometers would also be able to be included.

In electrical contact with the temperature sensor 64 and accelerometer 71 there is included a Printed Circuit Board (PCB) 66, which receives temperature readings from the sensor, and transmits these readings by one or more antennas 68. The PCB 66 is powered by two button size batteries 70 as is typical within the art. It is envisaged that with usage of 8 hours per day the batteries would be sufficient to provide one year of transmission before the unit would need replacing.

A sealing gasket or O ring 69 is included so as seal off the PCB and other electrical components retained in the plastic epoxy cap 63 from external environment and grease, water etc. Advantageously, the sealing gasket may be maintained between the plastic epoxy cap 63 and metal grease cap 61 to form the cap housing 62; with the whole assembly 63 attached by fastening means 65 (The fastening means depicted are screws although other fastening means could also be used with departing from the present invention).

Optionally, a visual temperature indicator 73 (not shown) such as an LED may also be included for providing a visual indication of when the temperature detected by the temperature sensor 64 is above a predetermined value.

Advantageously, the entire device is encased with epoxy filler 74 (not shown) to protect the device from water while at the same time enable the temperature sensor to receive readings from the bearings and to transmit.

Figure 3A:
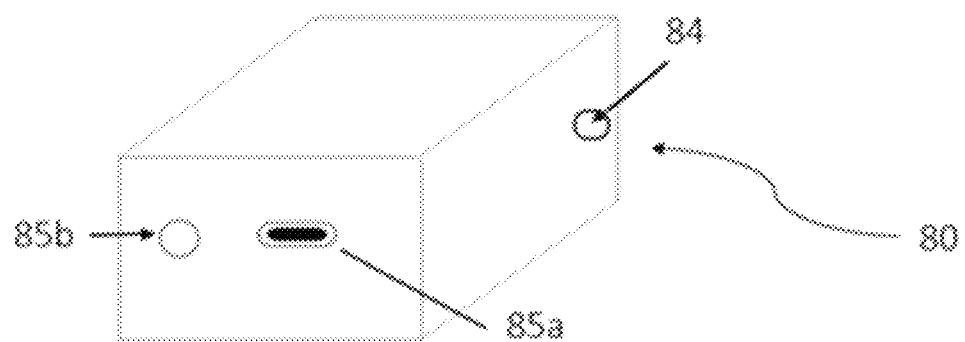
FIG. 3a is a schematic perspective view of the receiving/transmitting device according to an exemplary embodiment of the present disclosure.
Figure 3B:
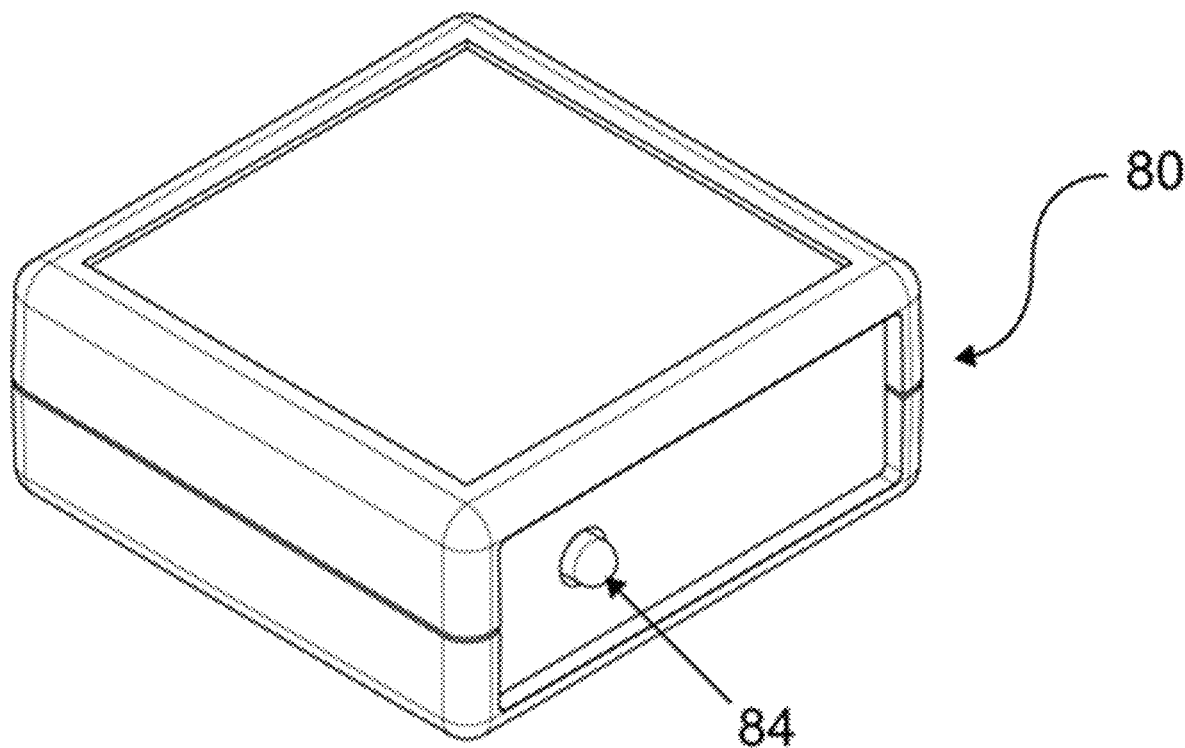
FIG. 3b is a perspective view of the receiving/transmitting device as depicted in FIG. 3a with the top cover in place.
Figure 3C:
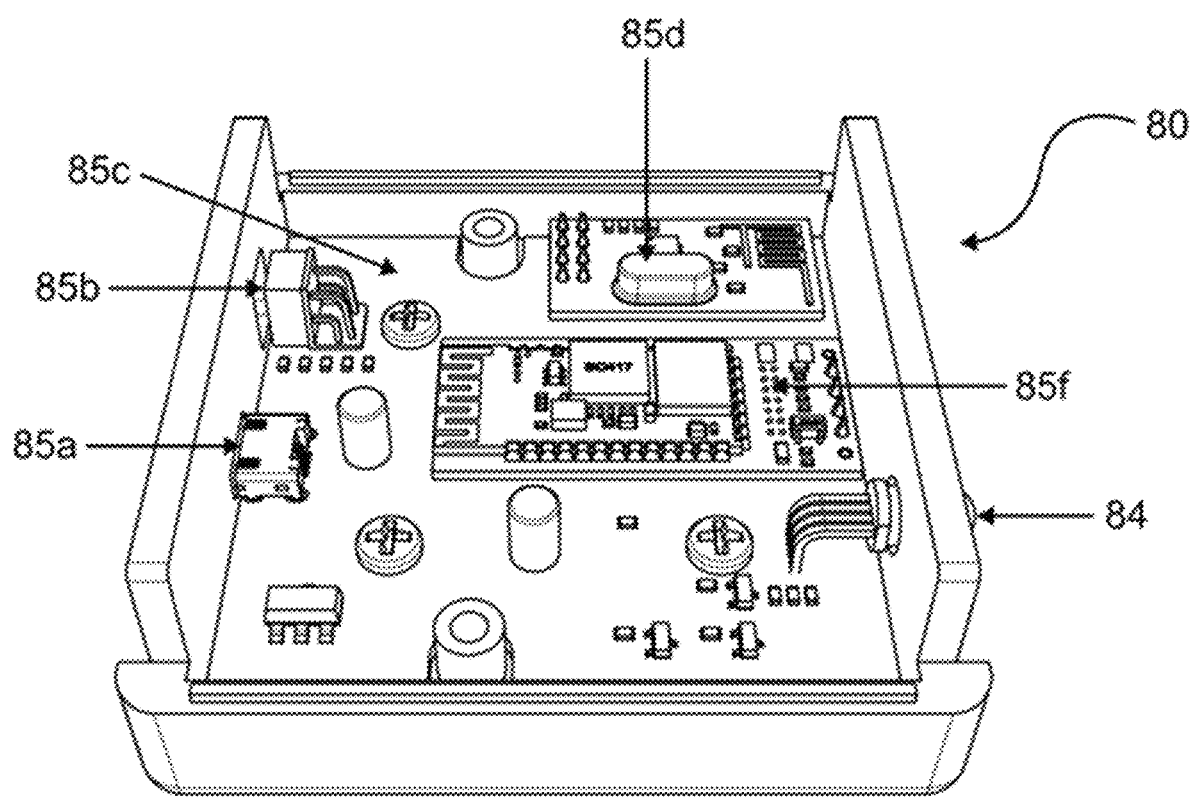
FIG. 3c is a perspective view of the receiving/transmitting device as depicted in FIG. 3a with the top cover removed.

Referring to FIGS. 3a-3c, there are provided exemplary views of the receiver/transmitter 80 of the present invention.

The receiver depicted includes a pairing button 82 for establishing a wireless communication link with one or more caps 60 which are fitted about a vehicle such as a trailer and for establishing a wireless link with one or more portable electronic communication devices. This is described in more detail below.

Advantageously, the receiver also includes a visible LED 84 for indicating the powered state as is typical in many devices. Optionally, the receiver/transmitter may be powered by a self contained battery or via connection to the electrical system of the vehicle. Advantageously, the receiver/transmitter is located near to the hubs for receiving the wireless transmission from the antennas of the one or more temperature reporting monitoring caps 60 which are fitted to the vehicle. It is envisaged that a possible location for the receiver/transmitter would be in the boot, in the back of the vehicle, or near a vehicle power supply outlet.

As can be seen in more detail in FIG. 3c the inside of the receiver includes a plurality of PCBs, including a USB port 85a, radio pairing button 85b, motherboard module 85c, Bluetooth module 85d and a sealed radio frequency module 85f.

Figure 4A:
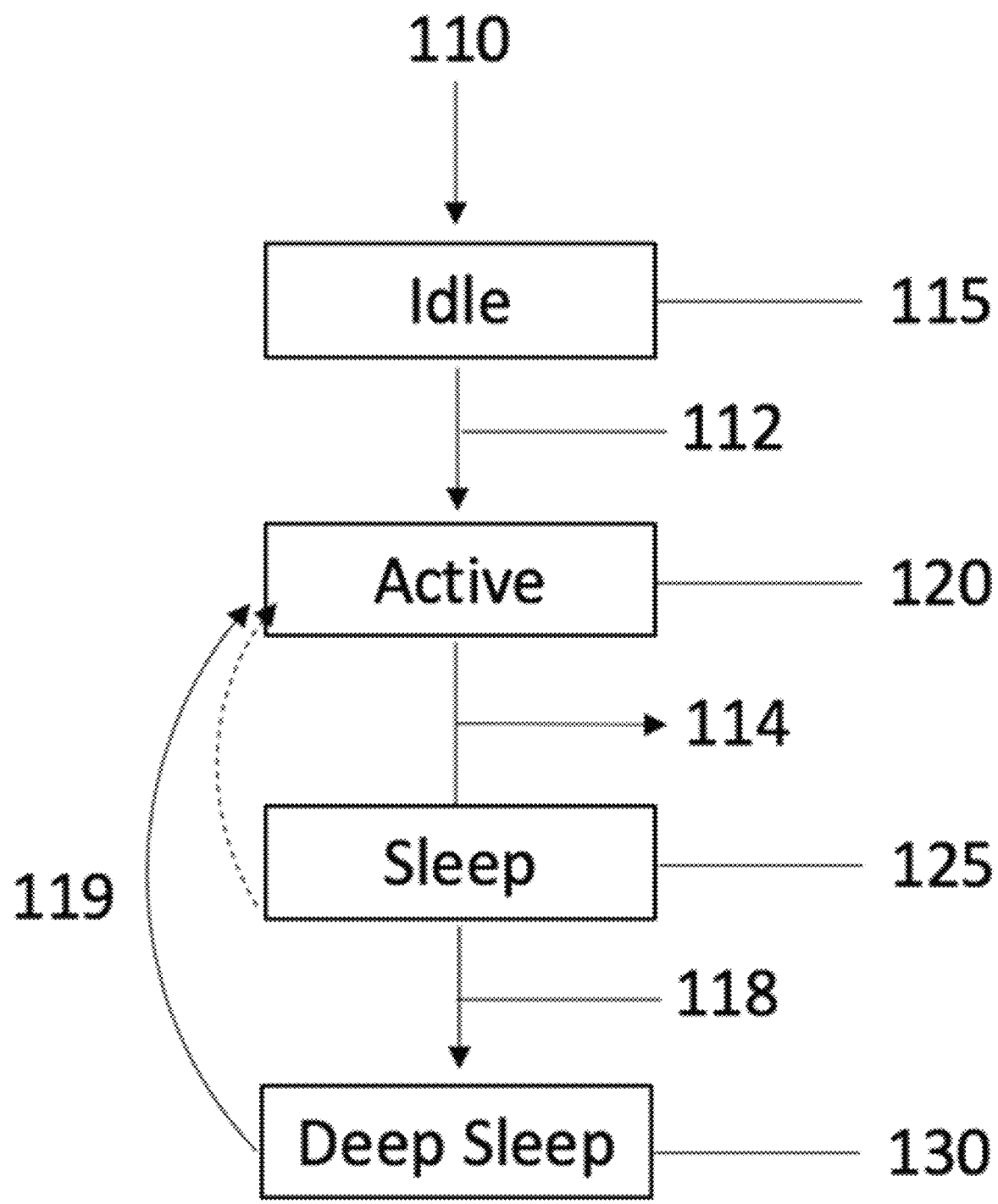
FIG. 4a is an exemplary state diagram of components of an embodiment of the present disclosure in an initial configuration mode.
Figure 4B:
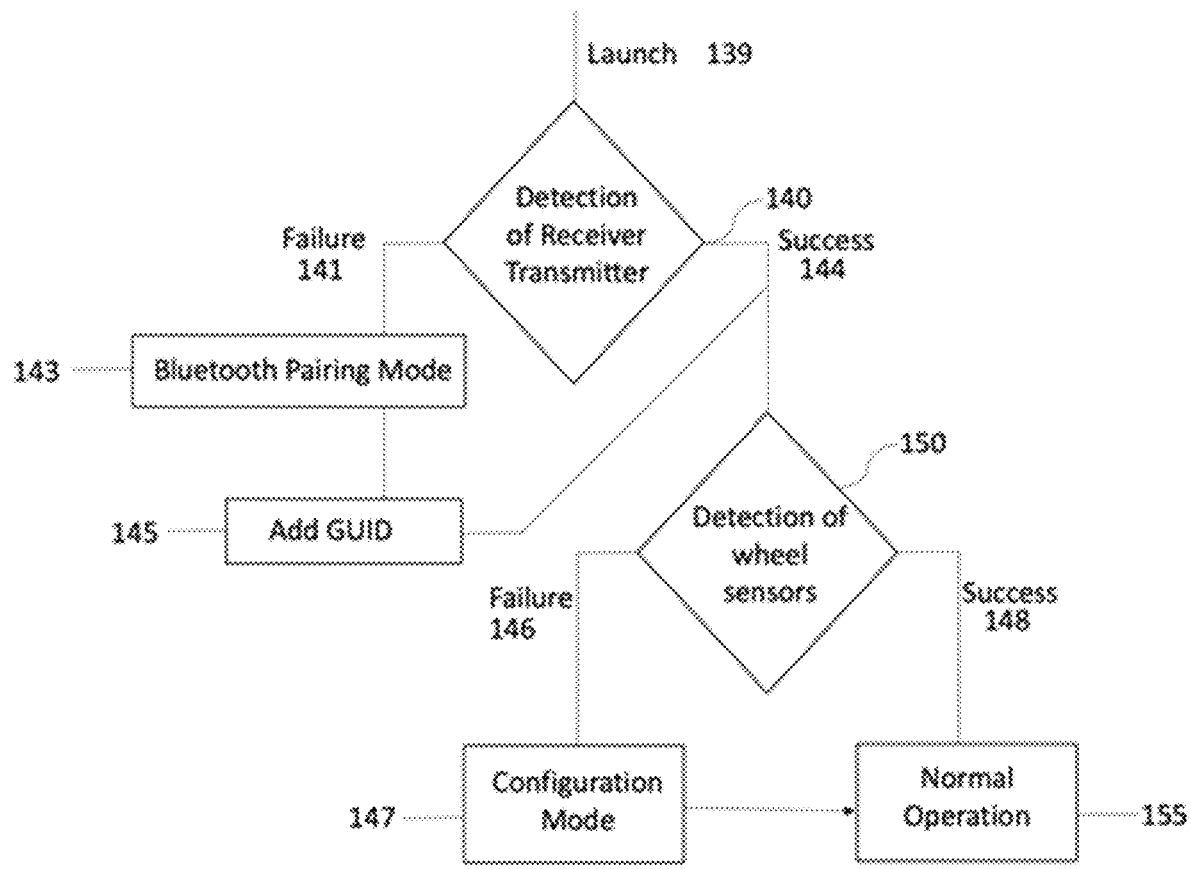
FIG. 4b is an exemplary state diagram of components of an embodiment of the present disclosure in an operational mode.
Figure 4C:
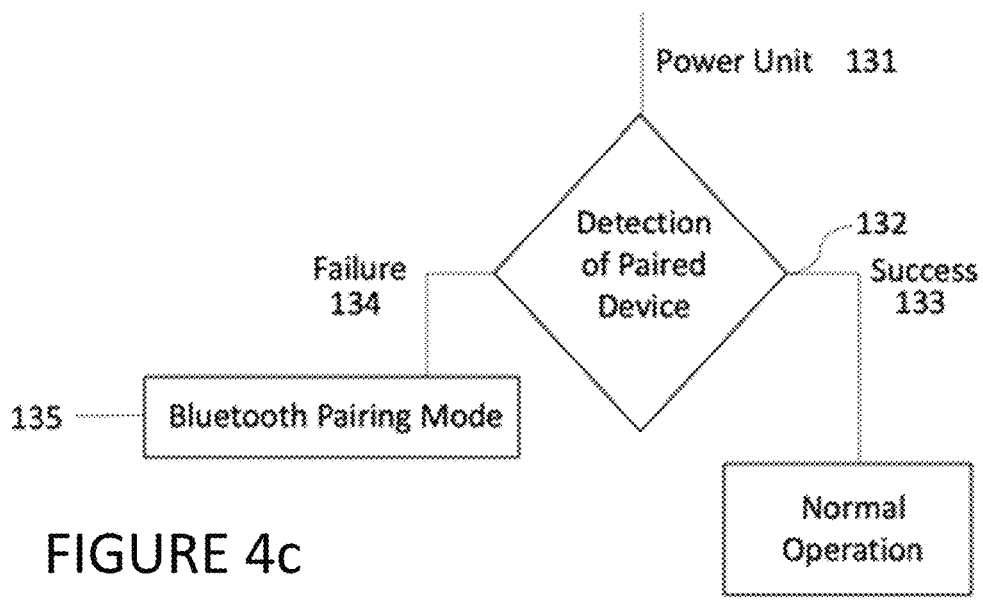
FIG. 4c is an exemplary state diagram of the various states of the receiver/transmitter unit 80.

Referring to FIG. 4a-c the initial setup mode and various states of the components of the temperature monitoring device of the present disclosure are depicted As depicted in FIG. 4A, there is shown a flow chart depicting an embodiment of the monitoring grease cap 60 of the present disclosure is shown.

The monitoring grease cap has a shelf storage reed switch to ensure that it remains in an inactive state—for example of the shelf of a shop awaiting sale, or in the garage awaiting attachment to the vehicle.

The reed switch is activated by tapping a magnet on top of it at step 110, the monitoring grease cap 60 enters an idle state 115. In the idle state, upon detection of wheel motion 112 by the accelerometer 71, then enters into an active monitoring state 120. In this state, the monitoring grease cap may be configured to detect temperature data, vibration data, battery status. Advantageously, the monitoring grease cap 60 is configured to encode the detected data with a unique Global Identifier; and transmit the information at predetermined time intervals using radio frequency or other appropriate transmission.

Once movement ceases at step 114, the monitoring grease cap can re-enter an idle state, "sleep mode" 125 from which it can immediately begin retransmission upon further movement (116) or after a predetermined time enter a further mode "deep sleep mode" 130 in which battery is powered off to negligible consumption. It would be appreciated that the sensor can be reactivated from "deep sleep" mode upon further detection of wheel motion as depicted by step 119.

As depicted in FIG. 4b, a flow chart shows the various states of the application software executing on a personal communication device such as a mobile phone, personal computer, tablet 100 or the like.

On launching the application 139, the software then enters a detection mode 140 where it attempts to detect the receiver/transmitter 80. In the embodiment depicted, a Bluetooth connection is established with the receiver/transmitter 80, although other types of short range connections such as WIFI.

If a Bluetooth connection has not been established between the device and the receiver/transmitter, the device enters into pairing mode 143 to establish an appropriate connection 144 with an appropriate global unique identifier 145 for the specific receiver/transmitter 80.

Alternatively, the smart phone/portable communication device 100 may also placed into discovery mode for detecting devices which are capable of wireless transmission in the vicinity of that device.

Advantageously, this wireless transmission may be Bluetooth or other similar short range wireless transmission such as WIFI.

Once a connection 144 is established or detected, the application on the device can determine configuration status (150). If not configured (146) can then enter configuration mode 147 (or if already configured) detect configuration state 148, and then enter normal operation mode 155.

In configuration mode, the application on the device can establish specific devices, user profile settings, device profile settings, temperature alert setting, data retention settings and other parameters for operation of the application.

After a communications link has been established between the receiver/transmitter device 80 and the smart phone/communication device 100, the user may also use an application operating on their portable communication device 100 to specify the unique identification numbers for the grease reporting caps, which are to be monitored by the receiver/transmitter device 80. In the initial setup mode the application program on the portable electronic communication device 100 may also provide functions to remove unique cap IDs, reset the receiver/transmitter device or provide firmware updates to the receiver/transmitter 80.

In this way, multiple monitoring caps 60 (attached to each hub of a vehicle) may be monitored by a single receiver/transmitter device 80 and corresponding portable communication device 100.

The application on the portable electronic communication device may also provide additional configuration options such as the ability update/rename the devices, create and maintain user profiles, update alert settings and to specify the time periods data is to be retained. These will be discussed in more detail below.

The user is also able to customize the specific alert parameters for each device being monitored, include visual and audible alarms when predefined temperature thresholds have been exceeded.

Upon entering into normal operation mode 155, the application on the device is able to decode data received from the Relay device and store this information, derive visualization information such as graphical representations of the data according to the user requirements.

As depicted at FIG. 4c, a flow chart depicts the various states of the receiver/transmitter unit 80. In one embodiment, once power is applied 131, the receiver/transmitter module 80 may be configured to detect whether a smart phone/portable communication device has been paired to it 132. If successful 133 the module 80 can enter Normal operation. If the module has not been paired to a portable electronic communication device, the module will enter a Bluetooth pairing mode 134.

Alternatively, the receiver/transmitter may be configured to simply transmit information received from remote monitoring sensors in range, in what amounts to pass through mode. In this arrangement, it is up to the portable communication device to manage the pairing with the receiver/transmitter module 80. Hence in this arrangement, the receiver will be transmitting information to any device within range; and it is the specific pairing between the receiver/transmitter will be solely managed by the application on the portable phone/communication device.

Advantageously, the receiver/transmitter device 80 may be configured to enter a discovery mode by depressing the on/off switch or similar for a predetermined amount of time (such as 5 seconds).

If the pairing between the receiver/transmitter and the portable electronic communication device is not successful on providing power to the receiving/transmitting 80 device, the receiving/transmitting device may be configured to provide a warning in the form of an audio signal or visual indication on the device.

Once the remote application 100 has the correct GUID's of the while wheel sensors 60, the remote computing device, will communicate to the wheel sensors via the receiver/transmitter module 80.

In this mode, data is receiver from the remote monitoring cap(s) 60 in the receiver/transmitter 70 via Radio Frequency. After authentication by comparison with an appropriate stored/configured global identifier, this information is then transmitted via Bluetooth or other appropriate short range communication protocol to the personal computing device such as a mobile phone. Further processing can then take place in the software application executing on the remote device as depicted in further figures of the present disclosure.

When movement is detected by the accelerometer, monitoring cap(s) 60 are configured to begin reading temperature (via the sensor 64), battery values and other relevant information, and begin transmitting this information together with their unique ID after a predetermined time frame via the antenna 68. Typically the frequency of measurements taken is every two minutes, although it would be appreciated that other time frames would also be possible.

Assuming that the pairing between the receiver/transmitter and portable electronic communication device is successful, in normal operational mode where a connection with the monitoring cap(s) 60 is established, an authenticated transmission link using the unique ID numbers for the monitoring caps can be established. In this normal operational state, the data can be received from the monitoring cap(s) 60 via Radio Frequency (RF) transmission, and re-transmitted to the portable electronic communication device 100 by Bluetooth (or similar) short range authenticated wireless transmission.

Referring now to FIGS. 5a-5d exemplary representations of typical interface provided in the application operating on the portable electronic communication device 100 are depicted.

Figure 5A:
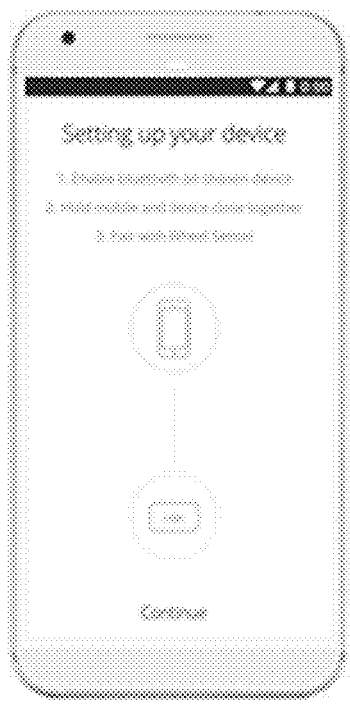

As shown in FIG. 5a, in the initial setup state the initial step of pairing the receiver/transmitter with the portable electronic communication device 100 is shown, together with instructions.

Figure 5B:
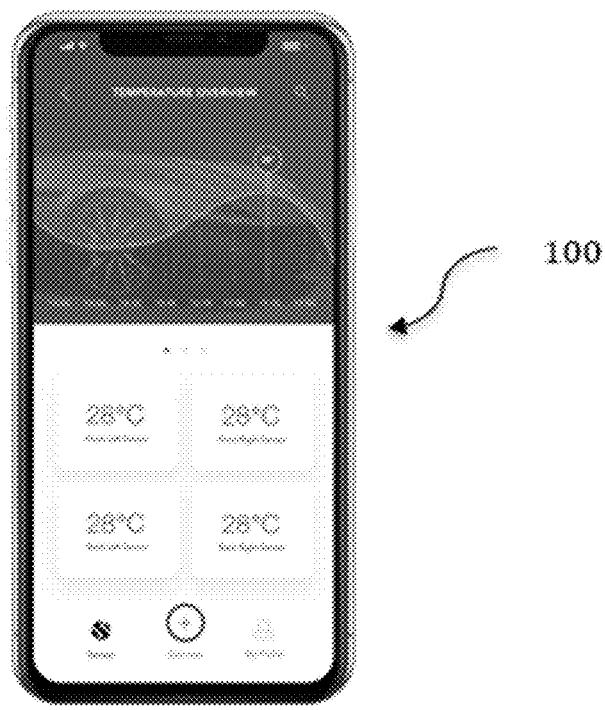
FIG. 5b is an exemplary schematic view of a screen of a portable electronic communication device displaying temperature information from a plurality of monitoring devices in communication with a common receiver/transmitter device.

In FIG. 5b there is also shown an exemplary display of a summary of the individual sensor cap temperatures.

Figure 5C:
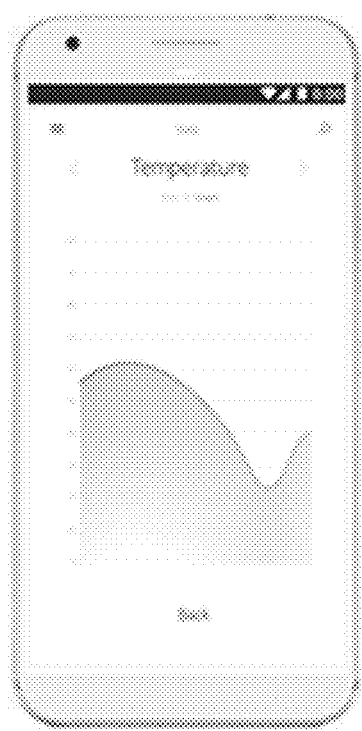
FIG. 5c is an exemplary schematic view of a screen of a portable electronic communication device graphically displaying temperature information for a selected monitoring device attached to one wheel hub.

FIG. 5c depicts an exemplary graphical history of the temperature readings.

Figure 5D:
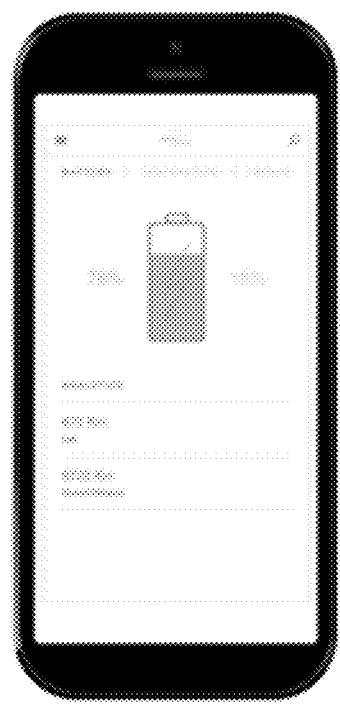
FIGS. 5d and 5e are exemplary schematic views of a screen of a portable electronic communication device displaying additional information on battery levels and other information such as distance information.
Figure 5E:
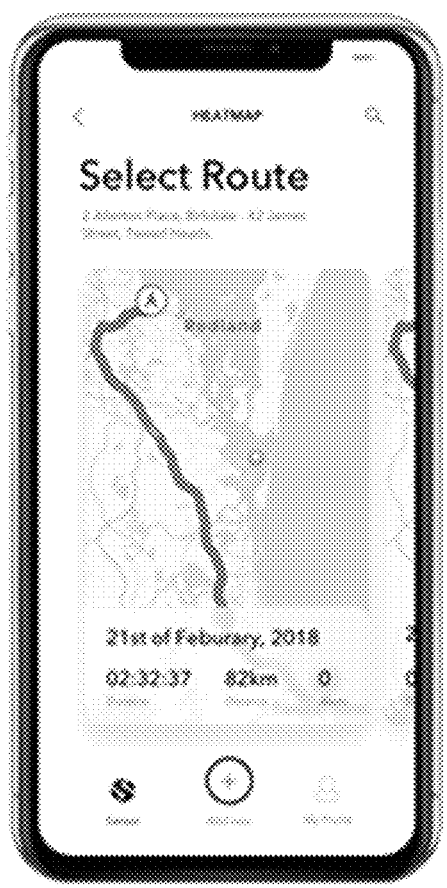

FIGS. 5d and 5e depicts typical information on battery levels and other information such as distance information. Other representations would of course be possible without departing from the present invention.

The present invention provides a way of monitoring bearing "health" by providing real time feedback on the most significant symptom of potential problems-increased temperature. Optionally, the present invention may also provide information on wheel tilt of the wheel/hub relative to the vertical once it passes a predefined angle, which can often also be an indication of imminent failure.

With almost all operators of machinery in today's world carrying portable electronic communication devices with a significant amount of computational and display possibility, the present disclosure teaches the use of an intermediary receiver/transmitter which receives information from remotely located sensors and transmits this information to the user's device.

The inclusion of the receiver/transmitter in the arrangement of the present invention provides transmission stability.

Advantageously, the monitoring cap arrangement of the invention can be configured to replace standard wheel caps, without requiring any modification to the wheel hub assembly. By taking advantage of the computational power on the personal communication device; the monitoring cap and the receiver/transmitter have relatively simple operational requirements with all of the complex display, monitoring, recording and alerting functions handled in the software of the application.

The present disclosure provides convenient, accurate and reliable information as to the temperature of the bearings, which is otherwise unavailable, allowing the user to take preventative maintenance before potentially catastrophic failure.

The invention claimed is:

1. A temperature monitoring system for a wheel assembly comprising:
    a monitoring device comprising,
        a cup-shaped, metal grease cap having a peripheral rim engageable with an outer bearing seat of a wheel hub,
        said grease cap retaining grease inside the outer bearing seat,
        said grease cap being engaged in thermal contact with the outer bearing seat;
        sensor housing cap attached outside said grease cap,
        a sensing unit mounted within said sensor housing cap,
        said sensing unit including a temperature sensor configured and arranged to sense a temperature of said metal grease cap,
        said sensing unit including a motion sensor configured and arranged to sense motion of said wheel hub,
        said sensing unit including a processor and a wireless transmitter in communication with said temperature sensor and said motion sensor and configured to process temperature information and motion information from said temperature sensor and said motion sensor and transmit said temperature information and motion information; and
    a remote receiver configured for wirelessly receiving the temperature information and the motion information from the sensing unit and wirelessly re-transmitting the temperature information and the motion information to a portable electronic communication device having a display screen.

2. The temperature monitoring system for a wheel assembly according to claim 1 wherein the sensing unit transmits the temperature information and the motion information to the remote receiver via radio frequency (RF) wireless transmission.

3. The temperature monitoring system for a wheel assembly according to claim 1 wherein the remote receiver re-transmits the information via Bluetooth wireless transmission to the portable electronic communication device.

4. The temperature monitoring system for a wheel assembly according to claim 1 wherein the temperature sensor is a contact sensor in thermal contact with the metal grease cap.

5. The temperature monitoring system for a wheel assembly according to claim 1 wherein the processor of the sensing unit is configured to commence transmission of the temperature information upon detection of motion.

6. The temperature monitoring system for a wheel assembly according to claim 1 wherein the motion sensor comprises an accelerometer in the sensing unit detects the motion of the bearings.

7. The temperature monitoring system for a wheel assembly according to claim 1 further including a visual indicator mounted to the sensor housing cap for visually displaying that a predetermined temperature threshold has been exceeded.

8. The temperature monitoring system for a wheel assembly according to claim 1 wherein the motion information includes information as to the relative tilt angle of the wheel hub.

9. The temperature monitoring system for a wheel assembly of claim 1, wherein the sensing unit further comprises:
    a non-transitory machine-readable storage medium coupled to the one or more processors and having instructions stored in the storage medium, which when executed by the one or more processors, cause the monitoring device to:
    transmit unique identification information of the monitoring device for establishing a wireless communications link between the monitoring device and a remote relay device,
    periodically detect and transmit over said link a plurality of temperature measurements of a hub of the wheel assembly during one or more time intervals to the remote relay device for retransmission to a portable electronic communications device,
    upon detecting the absence of movement over a predetermined time determining that the wheel assembly has transitioned into an inoperative state and to decrease the power provided to the one or more sensors.

10. The temperature monitoring system for a wheel assembly according to claim 4 wherein the processor of the sensing unit is configured to commence transmission of the temperature information upon detection of motion.

11. The temperature monitoring system for a wheel assembly according to claim 5 wherein the motion information includes information as to the relative tilt angle of the wheel hub.

12. The temperature monitoring system for a wheel assembly of claim 5, wherein the sensing unit further comprises:
    a non-transitory machine-readable storage medium coupled to the one or more processors and having instructions stored in the storage medium, which when executed by the one or more processors, cause the monitoring device to:
    transmit unique identification information of the monitoring device for establishing a wireless communications link between the monitoring device and a remote relay device,
    periodically detect and transmit over said link a plurality of temperature measurements of a hub of the wheel assembly during one or more time intervals to the remote relay device for retransmission to a portable electronic communications device, upon detecting the absence of movement over a predetermined time determining that the wheel assembly has transitioned into an inoperative state and to decrease the power provided to the one or more sensors.

13. The temperature monitoring system for a wheel assembly of claim 8, wherein the sensing unit further comprises:
a non-transitory machine-readable storage medium coupled to the one or more processors and having instructions stored in the storage medium, which when executed by the one or more processors, cause the monitoring device to:
transmit unique identification information of the monitoring device for establishing a wireless communications link between the monitoring device and a remote relay device,
periodically detect and transmit over said link a plurality of temperature measurements of a hub of the wheel assembly during one or more time intervals to the remote relay device for retransmission to a portable electronic communications device,
upon detecting the absence of movement over a predetermined time determining that the wheel assembly has transitioned into an inoperative state and to decrease the power provided to the one or more sensors.

14. A temperature monitoring device for a wheel assembly comprising:
a cup-shaped, metal grease cap having a peripheral rim engageable with an outer bearing seat of a wheel hub,
said grease cap retaining grease inside the outer bearing seat,
said grease cap being engaged in thermal contact with the outer bearing seat;
sensor housing cap attached outside said grease cap,
a sensing unit mounted within said sensor housing cap,
said sensing unit including a temperature sensor configured and arranged to sense a temperature of said metal grease cap,
said sensing unit including a motion sensor configured and arranged to sense motion of said wheel hub,
said sensing unit including a processor and a wireless transmitter in communication with said temperature sensor and said motion sensor and configured to process temperature information and motion information from said temperature sensor and said motion sensor and transmit said temperature information and motion information.

15. The temperature monitoring system for a wheel assembly according to claim 14 wherein the temperature sensor is a contact sensor in thermal contact with the metal grease cap.

16. The temperature monitoring system for a wheel assembly according to claim 14 wherein the processor of the sensing unit is configured to commence transmission of the temperature information upon detection of motion.

17. The temperature monitoring system for a wheel assembly according to claim 14 wherein the motion sensor comprises an accelerometer in the sensing unit detects the motion of the bearings.

18. The temperature monitoring system for a wheel assembly according to claim 14 further including a visual indicator mounted to the sensor housing cap for visually displaying that a predetermined temperature threshold has been exceeded.

19. A wheel bearing temperature monitoring system comprising:
a plurality of monitoring devices as claimed in claim 14, each secured to a respective wheel assembly; and
a remote receiver configured for wirelessly receiving the temperature information and the motion information from the sensing unit of each of said respective monitoring devices and wirelessly re-transmitting the temperature information and the motion information to a portable electronic communication device having a display screen.

20. The wheel bearing temperature monitoring system of claim 19, wherein each respective sensing unit further comprises:
a non-transitory machine-readable storage medium coupled to the one or more processors and having instructions stored in the storage medium, which when executed by the one or more processors, cause the monitoring device to:
transmit unique identification information of the monitoring device for establishing a wireless communications link between the monitoring device and a remote relay device,
periodically detect and transmit over said link a plurality of temperature measurements of a hub of the wheel assembly during one or more time intervals to the remote relay device for retransmission to a portable electronic communications device,
upon detecting the absence of movement over a predetermined time determining that the wheel assembly has transitioned into an inoperative state and to decrease the power provided to the one or more sensors.

\* \* \* \* \*